Feb. 22, 1966   G. A. SCHARMER   3,235,886
KITCHEN SINK AND METHOD OF MAKING THE SAME
Filed June 24, 1963
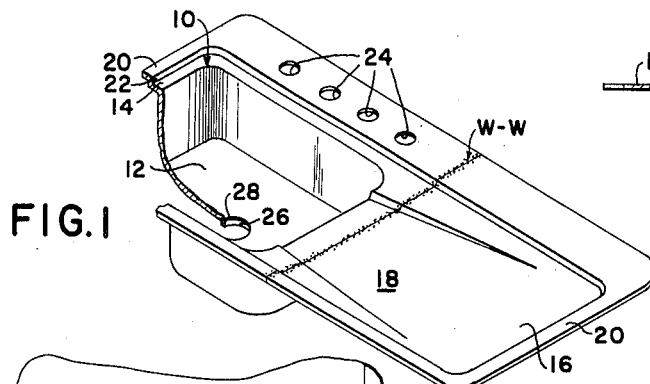
FIG.1
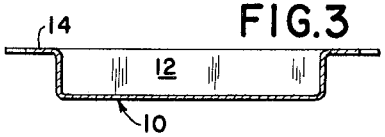
FIG.3
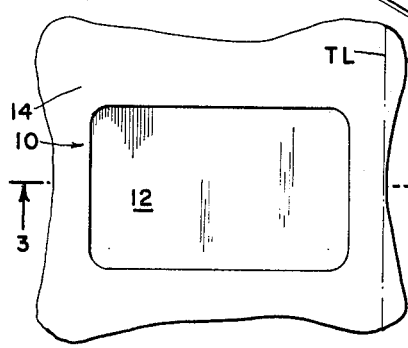
FIG.2
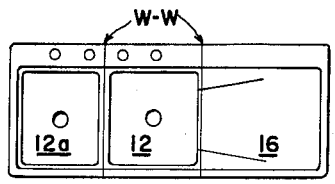
FIG.7
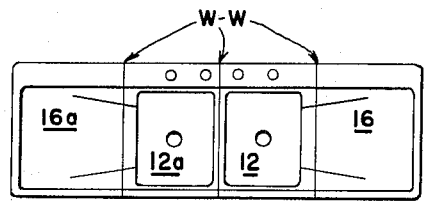
FIG.8
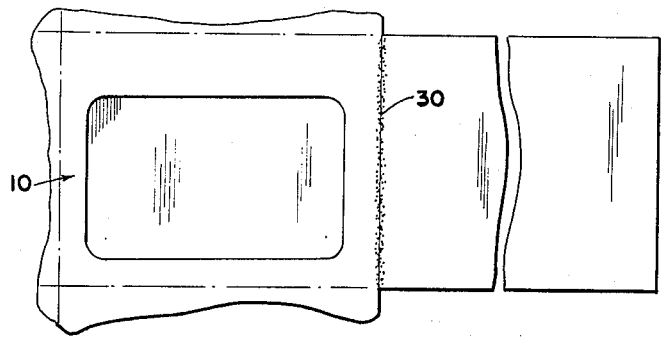
FIG.4
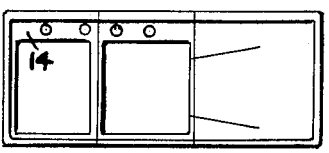
FIG.9
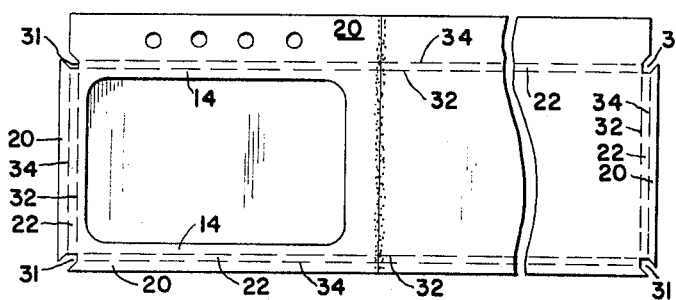
FIG.5
FIG.6
INVENTOR.
GEORGE A. SCHARMER
BY George H. Mortimer
ATTORNEY

United States Patent Office 3,235,886
Patented Feb. 22, 1966

3,235,886
KITCHEN SINK AND METHOD OF
MAKING THE SAME
George A. Scharmer, 83 Oliver Place, Ringwood, N.J.
Filed June 24, 1963, Ser. No. 290,065
8 Claims. (Cl. 4—187)

The present invention relates to a kitchen sink and the method of making the same and, more particularly, to a flat rim stainless sheet metal sink and drainboard unit.

The method of making flat rim stainless metal sink and drainboard units currently used and accepted as standard practice in the industry comprises deep drawing a sheet of stainless metal, with intermediate anneal or anneals, to the depth of bowl desired, cutting a blank for the drainboard and supporting rim for the unit to desired size and stamping a hole therein of proper size to accommodate the bowl, welding the bowl completely around the top opening to the edge of the hole to make the two units integral and then grinding off the weld and polishing the working surface of the sink-drainboard unit.

The preferred metal used in the manufacture of such sink-drainboard units is known in the art as Type 300 series stainless steel. This metal has cold working properties that limit the depth of a single deep drawing operation because it work hardens so much that permanent sets, deformations or fractures occur if this limit is exceeded. Thus in making a popular size bowl 16 by 20 by 7 inches a sheet of 0.05 or 0.0375 inch thickness can be deep drawn to a depth of 6 inches only before an intermediate anneal is required to enable the final draw of 7 inch depth. For this bowl a sheet 43.5 by 22.5 inches is used for the drainboard and supporting rim and it requires 69 inches of welding and grinding.

The present invention provides a sink-drainboard unit comprising a stainless sheet metal deep drawn sink having a bowl and a rim on at least one side of, and preferably surrounding, the bowl and a drainboard of stainless sheet metal butt welded solely along a straight line to the said rim on one or both sides of the bowl. In a preferred embodiment of the invention the bowl is deep drawn without intermediate annealing to the safe depth, e.g., 6 inches, leaving a rim or margin around it, and the additional desired depth, e.g., of 1 inch, is provided by offsetting the supporting rim for the unit above the plane of the rim and drainboard by a connecting wall. The bowl can also be a double or multiple one is desired, either of the same or different depths.

In the method of manufacture the sheet used for the deep drawing of the bowl is selected of large enough size that the rim left can be used for the upturned connecting wall and supporting rim on the front, back and one end where only one drainboard is used while the rim at the side where the drainboard is attached is trimmed straight and butt welded to the flat stainless metal sheet for the drainboard. In this case the weld is only a fraction of the length of the joint in the currently used practice and it is all on the flat which makes the grinding operation to remove the welt formed in the welding step, and the polishing of the welded unit, a much less expensive operation. The shaping operations, e.g., trimming, notching, pressing of a sloping drain area, forming of the offset supporting rim, etc., can be carried out readily after removal of the welt.

Further advantages and features of the invention will be made apparent from the following detailed description of the invention taken in conjunction with the drawing in which:

FIG. 1 is a perspective view of a preferred embodiment of the invention with parts from one end broken away to show structural details;

FIG. 2 is a plan view of a deep drawn bowl showing the general contour of the rim after the deep drawing operation;

FIG. 3 is a sectional view on the line 3—3 of FIG. 2;

FIG. 4 is a plan view of the bowl, after having been trimmed on the trim line TL of FIG. 2 and butt welded to a sheet of stainless sheet metal for the drainboard;

FIG. 5 is a plan view of the blank after grinding off the welt formed in the welding operation and trimming and notching the corners to form the offset supporting rim and connecting wall;

FIG. 6 is a plan view of a sink with two drainboards which is another preferred embodiment of the invention;

FIG. 7 is a plan view of a double bowl unit having a single drain board;

FIG. 8 is a plan view of a double bowl unit having two drainboards; and

FIG. 9 is a plan view similar to FIG. 6 in which the faucet openings are in the rim of the sink instead of the rim of the unit.

Referring now to FIG. 1, the sink-drainboard unit comprises a stainless sheet metal deep drawn sink 10 having a bowl 12 and a rim 14 surrounding the bowl. The rim is part of the sheet from which the bowl is deep drawn. In general the corner between the rim and the side wall of the bowl is rounded, e.g., on a radius of about ½ inch as seen in FIG. 3. At the right side of the bowl 12 is a drainboard 16 butt welded to the rim 14. If desired two drainboards 16 and 16a can be secured to the rim of the bowl as shown in FIG. 6. Also if desired two sinks can be butt welded together as shown in FIGS. 7 and 8 at 12 and 12a and secured to a single drainboard 16, as in FIG. 7 or to two drainboards 16 and 16a as seen in FIG. 8.

Preferably the drainboard is pressed in a die to form a sloping depressed area 18. This can be done readily after the butt welding operation and grinding off of the welt. This results in reduction of the radius of the rounded corner at the top of the wall of the bowl where the drainboard is depressed as will be appreciated from FIG. 1, while leaving the rim 14 of the sink and the margin of the drainboard 16 in the same plane. Where reference is made in the specification and claims to the plane of the sink rim and drainboard it will be understood that it is the plane of this rim and margin without regard to the bowl and the depressed area which do not lie in the plane.

In a preferred embodiment of the unit the supporting rim 20 of the sink-drainboard unit which is adapted to lie on a counter top of a kitchen cabinet (not shown) is offset from the plane of the sink rim and drainboard margin. Referring to FIG. 1 the supporting rim 20 is in a plane vertically offset above the plane of the sink rim 14 and drainboard 16 by the height of a connecting wall 22. While the sink rim 14 and the unit rim 20 may have any desired width and the wall 22 any desired height, satisfactory results have been achieved where the rim 14 at the sides where it is not attached to a drainboard and the rim 20 at the ends and front of the unit are each about ¾ inch wide and the wall 22 is about an inch high. This structure gives great strength to the unit against bending during handling and installation and the added depth provided by the wall 22 makes it possible to use a sink of less than normal depth, e.g., 6 instead of 7 inches, and still have the same overall depth of the sink bowl measured from the supporting unit rim 20. This has considerable advantage in cost of producing the units by making it possible to deep draw the sink from Type 300 stainless steel and analogous alloys without intermediate anneal.

In general it is preferred to make the supporting rim 20 at the rear edge of the unit wider than at the front and ends to provide space for openings 24 for faucet connections and the like, as seen in FIGS. 1, 5, 6, 7 and 8 but if desired the supporting rim 20 can be of uniform width and the sink rim 14 at the back can be made wider as seen in FIG. 9 to provide for such openings on the sink rim level or any intermediate level below the level of the supporting rim.

In the embodiment shown in FIG. 1 the use of a slidable work board is practicable which fits between the front and back connecting walls 22 and rests on the sink rim 14 when it overlies the bowl and on the margins of the drainboard when it overlies it. Such work boards per se are known in the art.

The sink bowl is provided with a drain opening 26 the edge of which is depressed as shown at 28 to receive the fittings for the drain pipe or the like.

The method of making the unit may be understood from FIGS. 2, 3, 4, 5 and 6 to which reference is now made.

The sink 12 is deep drawn from a sheet of stainless metal of sufficient size to leave at each side a rim which, after trimming, provides the necessary width desired. As shown in FIG. 2 the deep drawing operation leaves the corners of the sink rim extended further than the central portions, or in other words, the central portions are drawn in more during the drawing operation than the end portions along each side. It is this characteristic of the metal drawing process that makes it impracticable to make the sink and drainboard by drawing them from a single sheet metal blank.

The depth of draw which can be made without intermediate anneal varies with the different available metals and alloys but with the preferred stainless steel mentioned above it is practicable to make a 6 inch draw but not a 7 inch. The invention has particular advantage in that the connecting wall 22 can provide the desired additional depth and thus avoid the necessity for an intermediate anneal or anneals. The invention, however, is not restricted to this feature and contemplates the embodiments, both from the article and method aspects, where the sink blank is annealed at one or more intermediate stages of the deep drawing operations.

It will be noted from FIG. 2 that the rim at one side of the drawn sink (the upper side in the position shown) is wider than at the other three sides. This is the back of the sink in which the faucet openings will be stamped at a later stage of the process.

After the sink blank is drawn, one end margin (the one at the right in FIG. 2) is trimmed along a trim line TL to form a straight edge. Against this straight edge is butt welded a sheet of stainless metal for the drainboard 16, preferably by automatic means. The butt welding technique is so well understood in the art that description thereof is deemed unnecessary. It results in the formation of a welt 30 which preferably is next removed by grinding and the whole unit may then be polished, if desired. At this stage of the operations the welt lies along a flat surface so that the grinding and polishing operations can be simply done and the structure lends itself to automatic machine grinding and polishing because of the flat surface operation as opposed to the hand grinding and polishing required in the methods of manufacture heretofore employed in making sink-drainboard units.

After the butt welding the unit may be trimmed and notched as shown in FIG. 5 to exact blank size. This trimming and notching may precede or follow the grinding of the welt from and the polishing of the unit since the unit still is flat following trimming and notching. The faucet openings and drain opening can be formed at this stage also. The notches 31 are square at the ends of the strips that will form the connecting wall 22 where this is to be a straight vertical wall and on a 45° angle in line with the supporting rim 20 so that when the next operation of bending the connecting wall 22 at right angles upwardly from the rim 14 is performed the ends of the connecting walls lie adjacent to each other and when the supporting rim 20 is bent outwards horizontally from the wall 22 the ends thereof on the 45° cuts also lie adjacent to each other. These adjacent ends are then welded together, ground and polished.

Instead of notching and bending the unit as described above, the ground (and if desired polished) piece may be drawn in a suitable die that grips the margins and applies transverse pressure to the remainder of the surface of the unit to form the substantially vertical wall 22. In this case final trimming to size is done after this draw to provide the finished edges.

Where the drainboard is provided with a depressed area 18 as shown in the drawings, this can be formed at any convenient stage but preferably it follows the grinding and polishing of the welt area, e.g., after the trimming and notching of the blank in the first procedure described above, or either after or simultaneous with the drawing operation to form the vertical wall 22 as described in the second procedure.

From the foregoing description of the invention those skilled in the art will appreciate that it has many advantages and savings in material and operations over the presently accepted and practiced methods. While certain preferred embodiments of the article and method have been set forth, it will be understood that modifications and variations can be resorted to without departing from the spirit and scope of the invention as defined in the following claims.

Having thus described and illustrated the invention what is claimed is:

1. A sink-drainboard unit comprising a stainless sheet metal deep drawn sink having a bowl and a rim on at least one side of the bowl, said rim being part of the flat sheet from which the bowl is deep drawn and in the original plane of said sheet, and a flat drainboard of stainless metal sheet butt welded solely along a straight line in the plane of the rim and the drainboard to the said rim.

2. A sink-drainboard unit as set forth in claim 1 in which there is a drainboard butt welded to said rim on each of the opposite sides of the sink.

3. A dual sink-drainboard unit comprising two stainless sheet metal deep drawn sinks, each sink having a bowl and a rim extending outwardly from the bowl on at least opposite sides thereof, said rim being part of the flat sheet from which the bowl is deep drawn and in the original plane of said sheet, adjacent rims of said sinks being butt welded together, and a flat drainboard of stainless metal sheet butt welded solely along a straight line in the plane of the rim and the drainboard to the rim of at least one of said sinks opposite the rim which is butt welded to the other sink.

4. A sink-drainboard unit as set forth in claim 3 in which there is a drainboard butt welded to each of said sinks opposite the rim which is butt welded to the other sink.

5. The method of making a flat rim type stainless metal sink and drainboard unit comprising deep drawing a sink bowl in a piece of sheet metal of sufficient size to leave a flat rim surrounding the bowl, trimming at least one edge of the rim straight, butt welding a flat sheet of stainless sheet metal to said straight trimmed edge, removing any welt formed in said butt welding while the unit is still in the flat, notching the corners, bending the margin of the unit up and out to form a supporting rim offset from the plane of the sink rim and drainboard with a connecting wall therebetween, welding the corners, grinding and polishing the working surface in the vicinity of the welded corners.

6. The method as set forth in claim 5 in which the bowl is deep drawn without intermediate anneal to substantially the safe limit but less than the desired overall depth, and providing the desired depth from the supporting rim by the connecting wall.

7. The method as set forth in claim 5 in which the removing of the welt includes grinding and polishing operations while the unit is still in the flat.

8. The method of making a flat rim type stainless metal sink and drainboard unit comprising deep drawing a sink bowl in a piece of sheet metal of sufficient size to leave a flat rim surrounding the bowl, trimming at least one edge of the rim straight, butt welding a flat sheet of stainless metal to the straight trimmed edge, removing any welt formed in said butt welding while the unit is still in the flat, supporting the margin of the unit, drawing the sink and drainboard to offset the plane of the sink rim and drainboard from the supporting rim, and trimming the edges of the supporting rim.

References Cited by the Examiner
UNITED STATES PATENTS

| | | | |
|---|---|---|---|
| 2,062,809 | 12/1936 | Erickson | 4—187 |
| 2,273,606 | 2/1942 | Webber | 4—187 |
| 2,520,486 | 8/1950 | Ziegler et al. | 4—187 X |
| 2,908,019 | 10/1959 | Lyon | 4—187 |

LAVERNE D. GEIGER, *Primary Examiner.*

H. GROSS, *Assistant Examiner.*